United States Patent
Nilsson

(10) Patent No.: US 7,664,383 B2
(45) Date of Patent: Feb. 16, 2010

(54) MULTIPLE FRAME PHOTOGRAPHY

(75) Inventor: Rene Nilsson, Eslov (SE)

(73) Assignee: Sony Ericsson Mobile Communications AB, Lund (SE)

( * ) Notice: Subject to any disclaimer, the term of this patent is extended or adjusted under 35 U.S.C. 154(b) by 444 days.

(21) Appl. No.: 11/624,260

(22) Filed: Jan. 18, 2007

(65) Prior Publication Data

US 2008/0175575 A1 Jul. 24, 2008

(51) Int. Cl.
G03B 17/00 (2006.01)
(52) U.S. Cl. .......................................... 396/77; 359/698
(58) Field of Classification Search .................... 396/77, 396/85; 359/676, 698
See application file for complete search history.

(56) References Cited

U.S. PATENT DOCUMENTS

| | | | |
|---|---|---|---|
| 5,657,402 A * | 8/1997 | Bender et al. | 382/284 |
| 6,224,542 B1 * | 5/2001 | Chang et al. | 600/109 |
| 7,100,830 B2 * | 9/2006 | Murata et al. | 235/454 |
| 2004/0165085 A1 | 8/2004 | Shibutani | |
| 2005/0099514 A1 | 5/2005 | Cozier et al. | |
| 2005/0219386 A1 | 10/2005 | Stavely et al. | |
| 2006/0061678 A1 * | 3/2006 | Yamazaki | 348/349 |

FOREIGN PATENT DOCUMENTS

EP 0 940 978 A2 9/1999

OTHER PUBLICATIONS

International Search Report with written opinion dated Jan. 29, 2008, 13 pages.

* cited by examiner

*Primary Examiner*—Christopher E Mahoney
*Assistant Examiner*—Autumn Parker
(74) *Attorney, Agent, or Firm*—Harrity & Harrity, LLP

(57) ABSTRACT

A device may determine whether a user input for capturing a view is triggered and automatically frame a plurality of images of the view when the user input is determined to be triggered by repeatedly determining a zoom value for an image, optically zooming the view based on the zoom value, and capturing the zoomed view as the image.

19 Claims, 9 Drawing Sheets

MULTIPLE FRAME PHOTOGRAPHY

TECHNICAL FIELD OF THE INVENTION

Implementations described herein are related to photography and in particular, pertain to methods and devices for improving picture quality.

DESCRIPTION OF RELATED ART

A process for digitally framing a picture may involve magnifying and cropping the picture, such that the main subject of the picture is resized. For example, if a picture of an apple is 1024 pixels by 512 pixels, and the apple has the diameter of 20 pixels, the picture may be framed (i.e., magnified and cropped) so that the apple occupies a larger area within the picture.

In digital framing, a digital zoom may be used for magnifying the picture. More specifically, a digital zoom may be used to increase the number of pixels by the percentage by which the picture is magnified. Because the digital zoom creates new pixels by interpolating the existing ones, the digital zoom may introduce defects during the magnification.

SUMMARY

According to one aspect, a method may comprise determining whether a user input for capturing a view is triggered, and automatically framing a plurality of images of the view when the user input is determined to be triggered by repeatedly determining a zoom value for an image, optically zooming the view based on the zoom value, and capturing the zoomed view as the image.

Additionally, determining a zoom value for the image may include determining a zoom value that is unique among a plurality of zoom values for the images.

Additionally, determining a zoom value for the image may include accepting a user zoom, and producing a zoom value by determining a magnification of a view relative to the user zoom.

Additionally, determining a zoom value may include accepting a user input that specifies a number of the plurality of images, and accepting user inputs that specify a zoom value for each of the plurality of images.

Additionally, automatically framing may further include obtaining luminance sensor outputs or focus sensor outputs.

Additionally, automatically framing may further include determining a shutter speed or an aperture size based on the zoom value.

Additionally, automatically framing may further include determining a shutter speed, or an aperture size based on the luminance sensor outputs.

Additionally, automatically framing may further include focusing the image based on the focus sensor outputs.

Additionally, automatically framing may further include transferring the captured image from a light sensor to memory.

Additionally, capturing the zoomed view as the image may include exposing a light sensor to the image for a predetermined duration of time.

According to another aspect, a device may comprise a lens assembly and a trigger for a multiple framing shot. Additionally, the device may include a processor for framing each of a plurality of images of a subject when the user activates the trigger by repeatedly establishing magnification information of an image, optically magnifying the subject based on the magnification information, and imaging the magnified subject to produce the image.

Additionally, the device may further comprise a luminance sensor for providing information related to brightness of the subject.

Additionally, the device may further comprise a film for imaging the magnified subject.

Additionally, the device may further comprise a light sensor for imaging the magnified subject.

Additionally, the lens assembly may include a zoom lens assembly for magnifying the subject and a shutter assembly for exposing the light sensor for a predetermined amount of time.

Additionally, the device may further comprise a user interface for accepting user inputs that specify a magnification for each of the plurality of images.

According to yet another aspect, a device may comprise means for storing images, means for optically zooming an image, means for triggering a multiple framing shot, and means for taking multiple images of a view when a multiple framing shot is triggered. Additionally, the means for taking multiple images may include means for determining zoom information of an image, means for driving the means for optically zooming a view based on the zoom information, and means for recording the zoomed view as the image in the means for storing images.

Additionally, the device may further comprise means for providing luminance information and focus information.

Additionally, the means for recording the zoomed view may include means for exposing a sensor to a predetermined amount of light, and means for transferring the image that is captured at the sensor to the means for storing images.

Additionally, the device may further comprise means for adjusting shutter speed when a view changes.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements. The term "camera," as used herein, may include a device that may capture and store images and/or video. For example, a digital camera may include an electronic device that may capture and store images and/or video electronically instead of using photographic film as in contemporary cameras. A digital camera may be multifunctional, with some devices capable of recording sound and/or video, as well as images.

A "subject," as the term is used herein, is to be broadly interpreted to include any person, place, and/or thing capable of being captured as an image. The term "frame" may refer to a closed, often rectangular border of lines or edges (physical or logical) that enclose the picture of a subject. Depending on context, "multiple framing" or "framing" may refer to automatically taking a predetermined number of pictures, one immediately after another, at different zooms to obtain images with different sizes of a subject relative to each image frame. A "multiple framing shot" may refer to a shot for multiple framing.

Exemplary Device

Figure 1A:
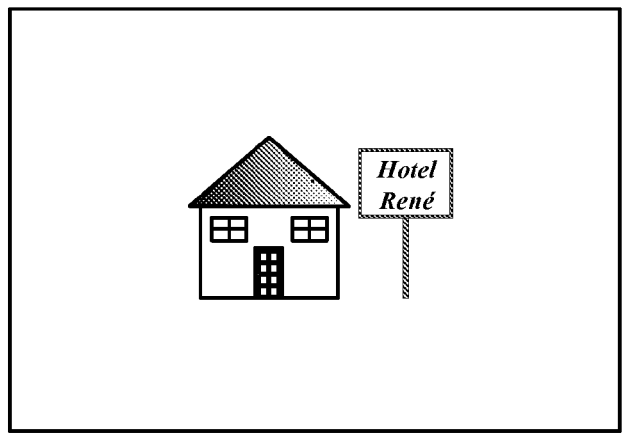
FIGS. 1A-1C shows exemplary pictures of a hotel at different magnifications.
Figure 1B:
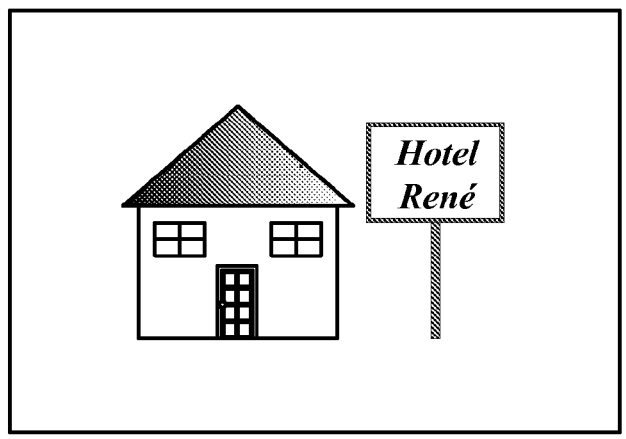
Figure 1C:
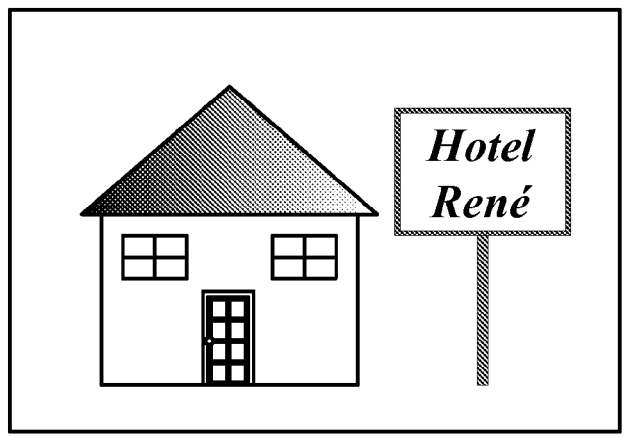

In the following implementations, a device may automatically perform multiple framing. For example, as illustrated in FIG. 1A-1C, when a user takes a shot of a hotel, the device may automatically take three pictures of the hotel. Each picture is at a different zoom level, and thus, the size and the location of the hotel relative to the frame in each picture is different from those in others pictures. In contrast to the digital framing as described above, the hotel is framed differently for each picture without any loss in image resolution.

Figure 2:
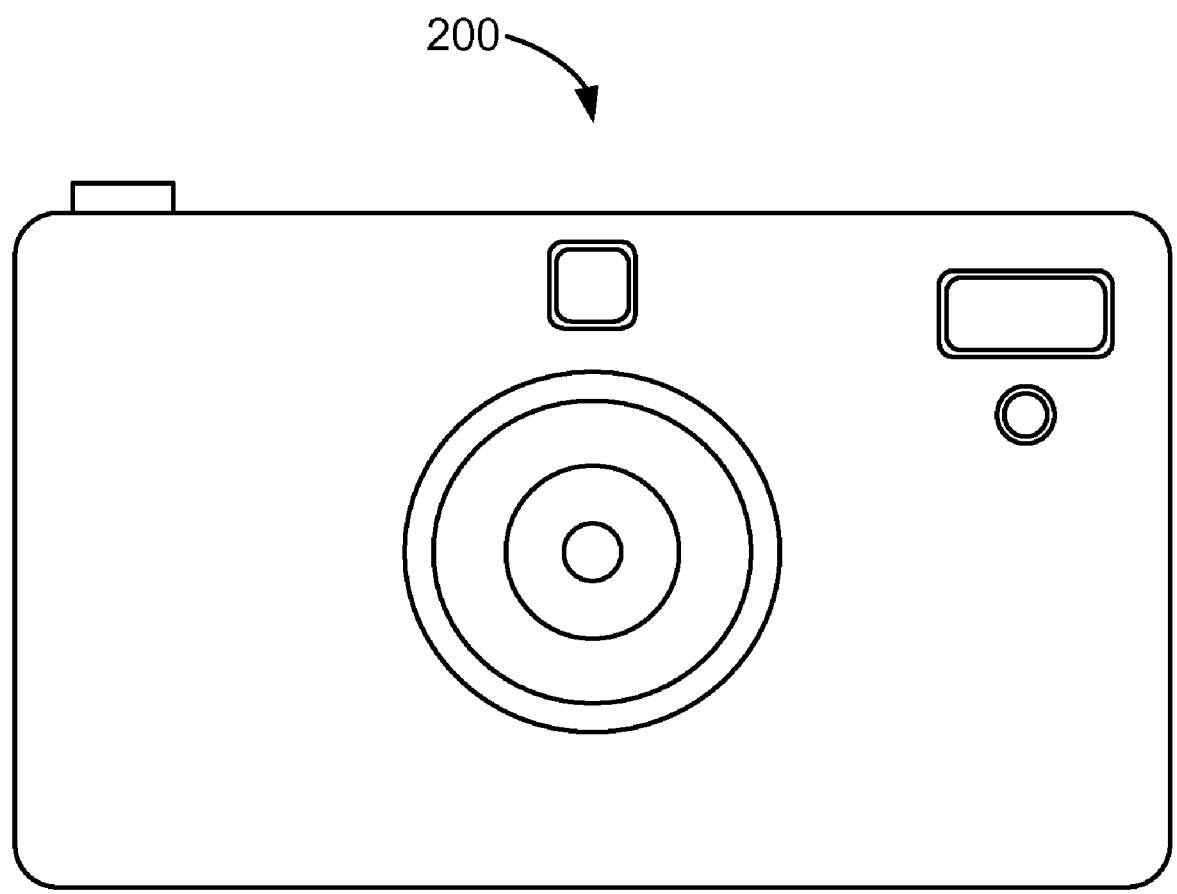
FIG. 2 shows a block diagram of an exemplary device in which systems and methods described herein can be implemented.

FIG. 2 depicts an exemplary device 200 in which systems and methods described herein can be implemented. Device 200 may include any of the following devices that have the ability to function as a camera or adapted to include one ore more digital or analog cameras: a radio telephone; a personal communications system (PCS) terminal that may combine cellular radiotelephone with data processing, facsimile, and data communications capabilities; a mobile telephone; an electronic notepad; a laptop; a personal computer (PC); a personal digital assistant (PDA) that can include a radiotelephone, pager, Internet/intranet access, web browser, organizer, calendar, and/or GPS receiver; or any device with sufficient computing power and memory to support functions described herein.

Figure 3:
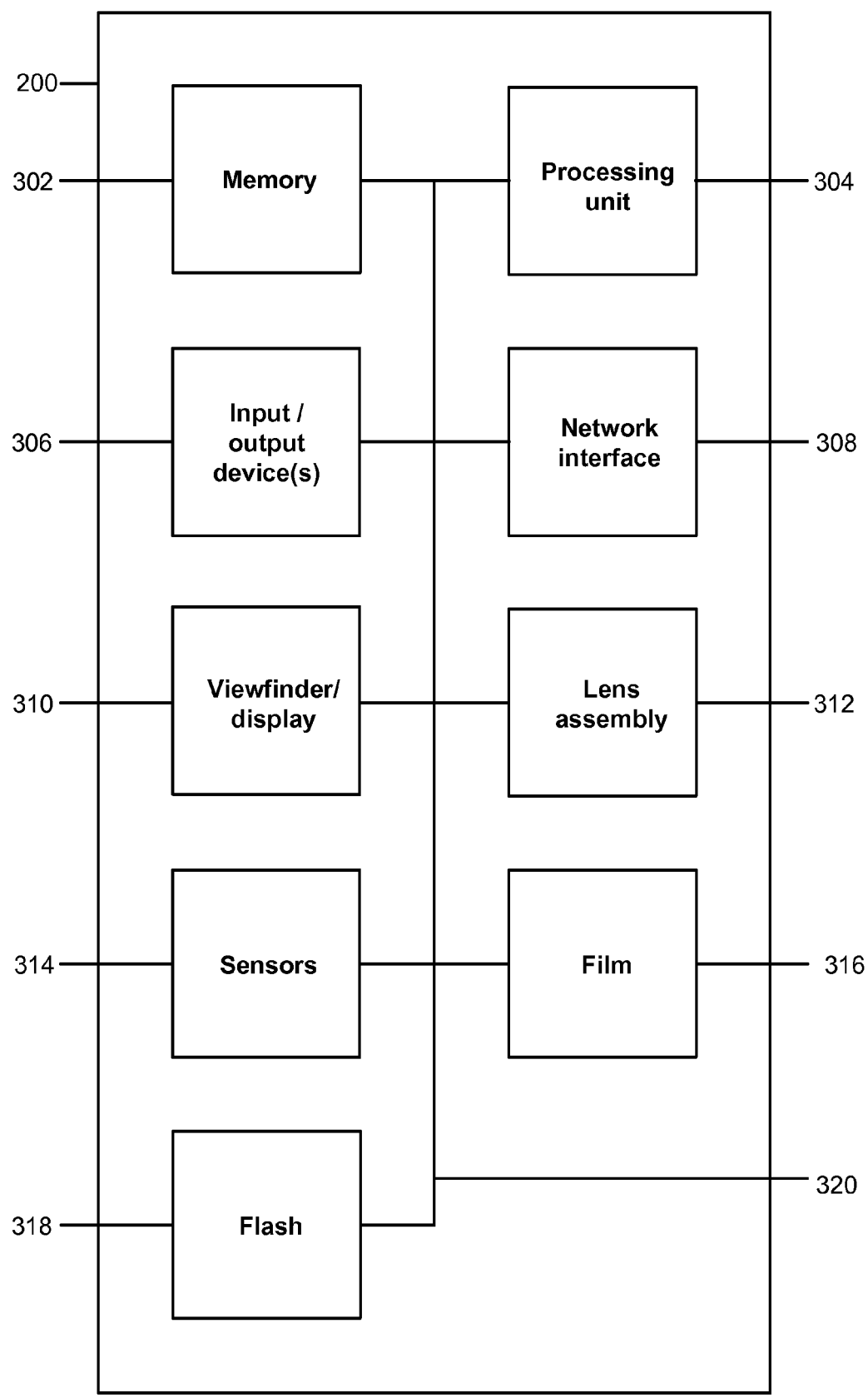
FIG. 3 is a functional block diagram of the exemplary device of FIG. 2.

FIG. 3 shows a functional block diagram of exemplary device 200. Device 200 may include memory 302, processing unit 304, input/output device(s) 306, network interface 308, viewfinder/display 310, lens assembly 312, sensors 314, film 316, flash 318, and communication bus 320. In another implementation, device 200 may include more, fewer, or different components. For example, when device 200 takes the form of a digital image capturing device, device 200 may not include film 316.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices.

Processing unit 304 may include one or more processors, microprocessors, and/or processing logic capable of controlling device 200. Input/output device(s) 306 may include a keyboard, key pad, button, mouse, speaker, microphone, Digital Video Disk (DVD) writer, DVD reader, USB lines, and/or another type of device for converting physical events or phenomena to and/or from digital signals that pertain to device 200.

Network interface 308 may include any transceiver-like mechanism that enables device 200 to communicate with other devices and/or systems. For example, network interface 308 may include mechanisms for communicating via a network, such as the Internet, a terrestrial wireless network, a satellite-based network, etc. Additionally or alternatively, network interface 308 may include a modem, an Ethernet interface to a LAN, and/or an interface/connection for connecting device 200 to other devices.

Viewfinder/display 310 may include a device that can display signals generated by device 200 as images on a screen and/or that can accept inputs in the form of taps or touches on the screen. Examples of viewfinder/display 310 include an optical viewfinder (e.g., a reversed telescope), a liquid crystal display (LCD), cathode ray tube (CRT) display, organic light-emitting diode (OLED) display, surface-conduction electron-emitter display (SED), plasma display, field emission display (FED), bistable display, and/or a touch screen. Viewfinder/display 310 may provide a window through which the user may view and/or focus on a subject, replay previously captured material, and/or provide inputs.

Lens assembly 312 may include a device for manipulating light rays from a given or a selected range, so that images in the range can be captured in a desired manner. Lens assembly 312 may be controlled manually and/or electromechanically by processing unit 304 to obtain the correct focus on a subject and a desired magnification of the subject image and to provide a proper exposure.

Sensors 314 may include one or more devices for obtaining information related to image, luminance, and focus. Sensors 314 may provide the information to processing unit 304, so that processing unit 304 may control lens assembly 312 and flash 318. Film 316 may include an analog medium of recording images of a subject.

Flash 318 may include any type of flash unit used in cameras. For example, flash unit 318 may include a flash unit built into device 200; a flash unit separate from device 200; an electronic xenon flash lamp (e.g., a tube filled with xenon gas, where electricity of high voltage is discharged to generate an electrical arc that emits a short flash of light); or a microflash (e.g., a special, high-voltage flash unit designed to discharge a flash of light with a sub-microsecond duration).

Communication bus 320 may provide an interface through which components of device 200 can communicate with one another.

Figure 4:
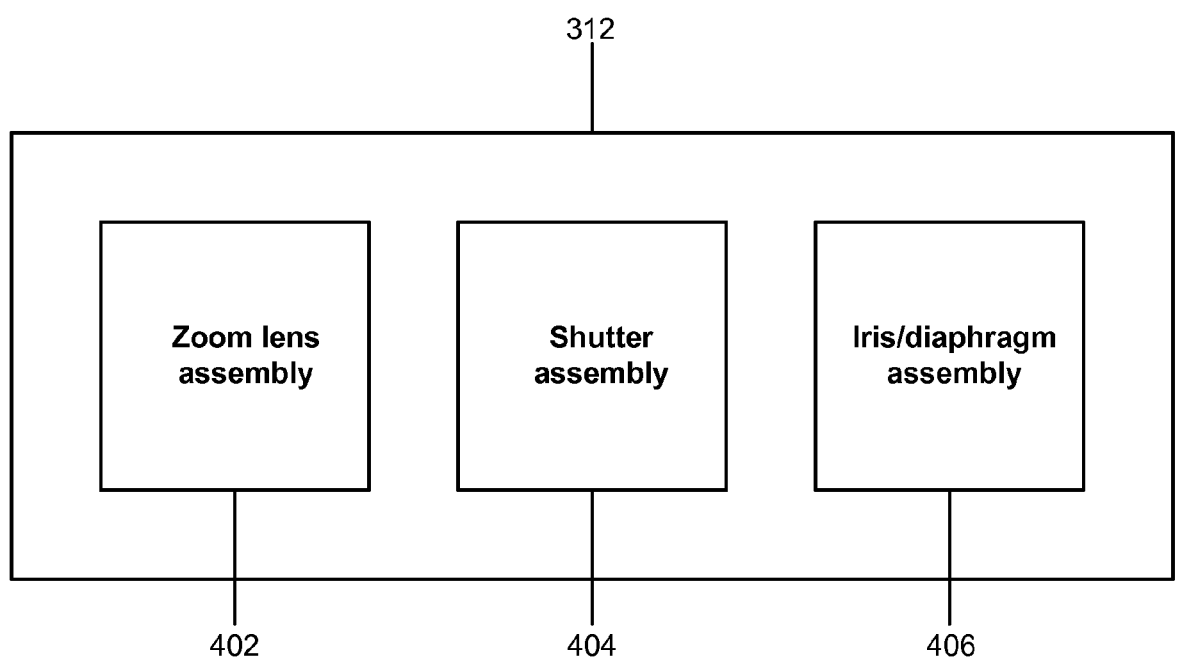
FIG. 4 is a functional block diagram of the lens assembly in FIG. 3.

FIG. 4 is a functional block diagram of the lens assembly 312 of FIG. 3. Lens assembly 312 may include a zoom lens assembly 402, a shutter assembly 404, and an iris/diaphragm assembly 406. In another implementation, lens assembly 312 may include more, fewer, or different components.

Zoom lens assembly 402 may include a collection of lenses. Zoom lens assembly 402 may provide a magnification and a focus of a given or selected image, by changing relative positions of the lenses. Shutter assembly 404 may include a device for allowing light to pass for a determined period of time. Shutter assembly 404 may expose sensors 314 and/or film 316 to a determined amount of light to create an image of a view. Iris/diaphragm 406 may include a device for providing an aperture for light and may control the brightness of light on sensors 314 and/or film 316 by regulating the size of the aperture.

Zoom lens assembly 402, shutter assembly 404, and iris/diaphragm assembly 406 may operate in conjunction with each other to provide a desired magnification and an exposure. For example, when a magnification is increased by using zoom lens assembly 402, shutter assembly 404 and iris/diaphragm assembly 406 may be adjusted to compensate for changes in the amount of light, in order to maintain the exposure relatively constant.

Figure 5:
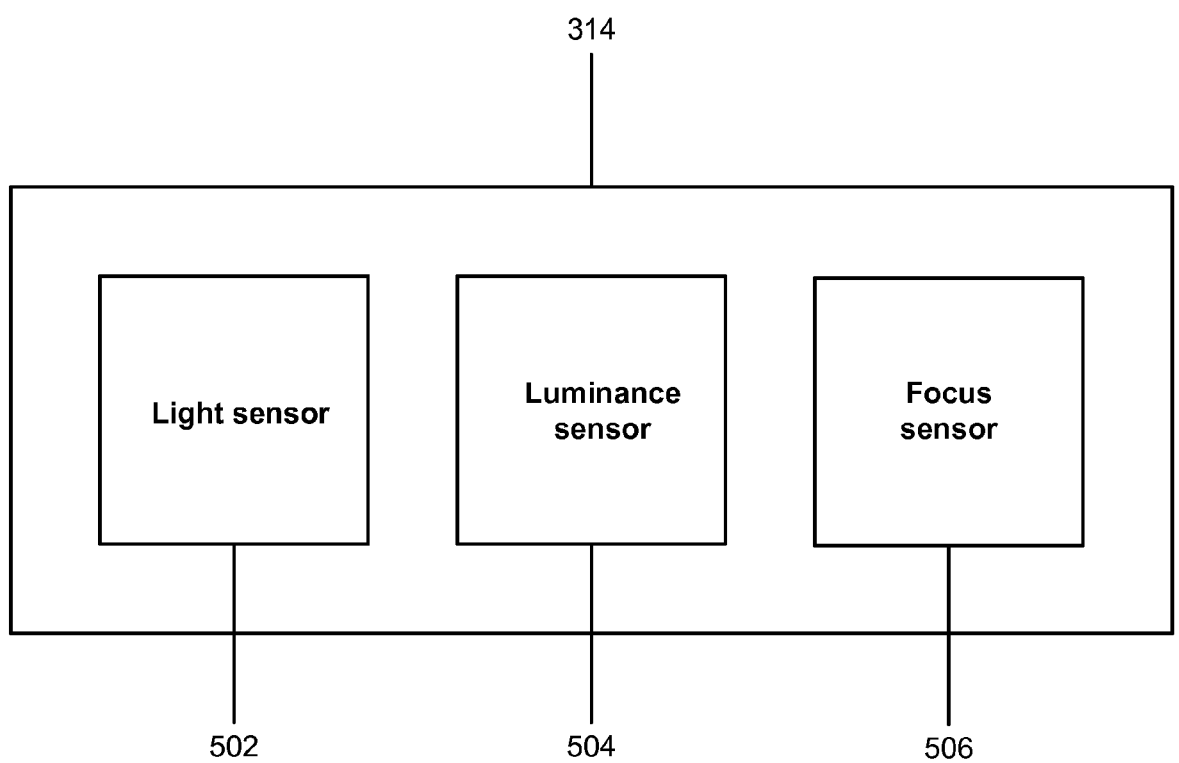
FIG. 5 is a functional block diagram of the sensors in FIG. 3.

FIG. 5 is a functional block diagram of the sensors 314 in FIG. 3. Sensors 314 may include a light sensor 502, a luminance sensor 504, and a focus sensor 506. In another implementation, sensors 314 may include more, fewer, or different components.

Light sensor 502 may include hardware and/or software for sensing light and storing an image. Luminance sensor 504 may include hardware and/or software for sensing the intensity of light (i.e., luminance) within a view. Luminance sensor 504 may provide luminance information that may be used for controlling flash 318 and the exposure of film 316 and/or light sensor 502. An example of luminance sensor 514 includes a flash sensor. In one implementation, luminance sensor 514 may include a white point detector. The white point of a view or a view depends on light source and may be used to white balance the view.

Focus sensor 506 may include hardware and/or software for providing information that may be used for focusing an image. In one implementation, focus sensor 506 may provide the distance of a subject from device 200, so that device 200 may adjust lens assembly 312 to obtain a properly focused image of the subject. In another implementation, focus sensor 506 may detect when lens assembly 312 outputs an image with the greatest contrast between measured light intensities at adjacent detector elements in sensor 314 and indicate the focused condition.

Figure 6:
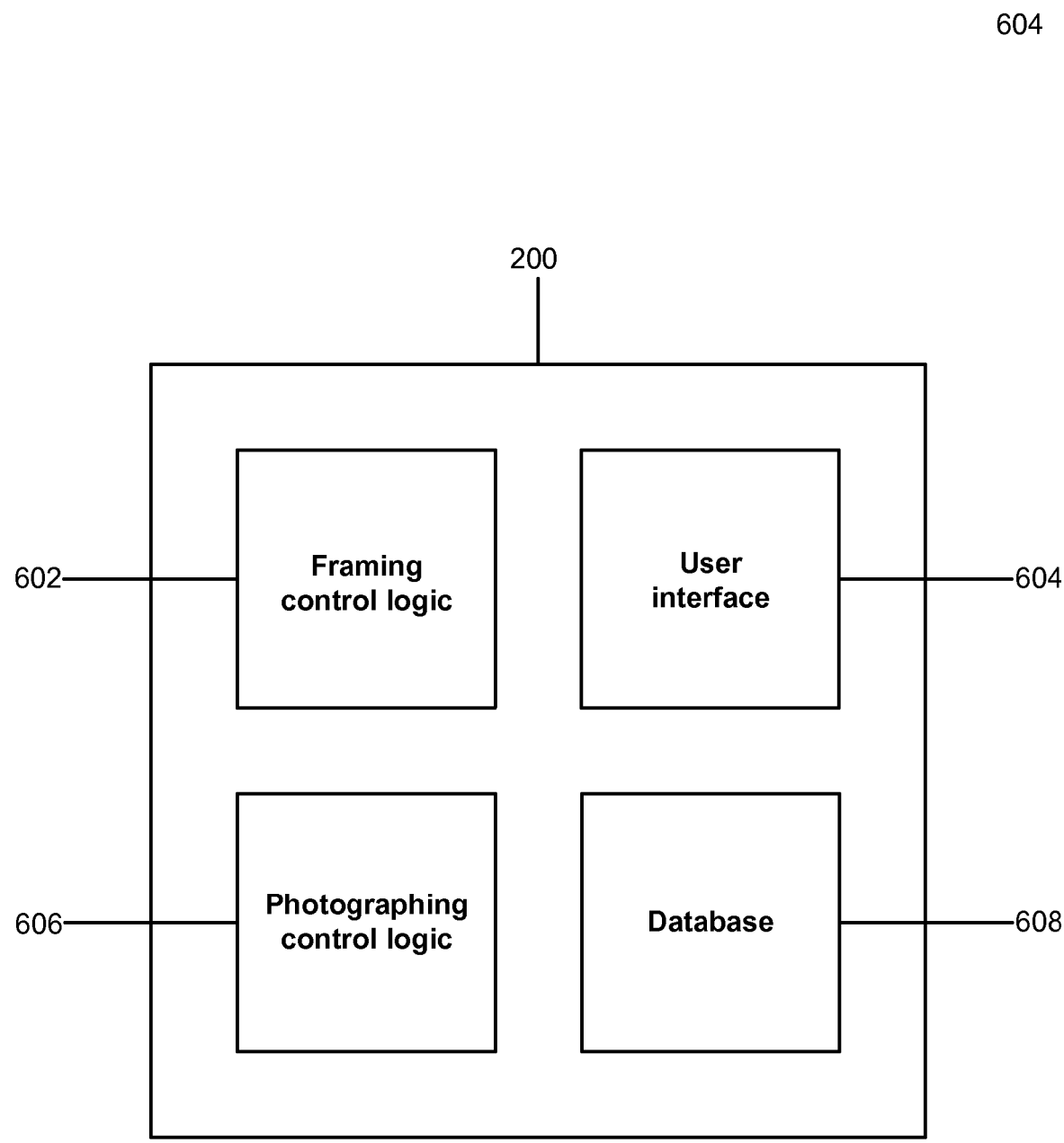
FIG. 6 is a functional block diagram of exemplary components that are either included in or implemented by the device of FIG. 3.

FIG. 6 is a functional block diagram of exemplary components that are either included in or implemented by device 200 of FIG. 3. Device 200 may include framing control logic 602, user interface 604, photographing control logic 606, and database 608.

Framing control logic 602 may include hardware and/or software for multiple framing. Framing control logic 602 may be implemented in many different ways, and in one implementation, framing control logic 602 may derive a value of the zoom for the first image in a multiple framing shot and then repeatedly apply a percent magnification, as specified by a user, to the subsequent shots in the same multiple framing shot. For example, if a multiple framing shot takes three pictures and applies 30% magnification, framing control logic 602 may determine the zoom of the first picture to be 30% less than the zoom at which the subject is shot; the next zoom may be determined to be the same as the zoom at which the subject is shot; and the last zoom to be 30% greater than the zoom at which the subject is shot. In another implementation, framing control logic 602 may store user-specified zoom values, measured relative to the zoom at which a user views the subject, for each image. For example, a user may specify 20% less zoom for the first image, 10% less zoom for the second image, 0% zoom for the third image, 10% greater zoom for the fourth image, and so forth.

User interface 604 may include hardware and/or software for accepting user inputs. In one implementation, user interface 604 may accept inputs for white balance, zoom, exposure value, shutter speed, and/or a size of the opening of an iris/diaphragm. In addition, for multiple framing, user interface 604 may accept values for a percentage magnification, a number of frames, a delay between shots, and/or a multiple framing state, which will be described shortly.

A zoom may indicate the desired level of magnification for each shot. An exposure value may convey to device 200 how much light to which light sensor 502 and/or film 316 may be exposed. A shutter speed may specify how quickly shutter assembly 404 opens and closes for allowing a pulse of light to reach film 316 and/or light sensor 502. A size for the iris/diaphragm opening may affect how large iris/diaphragm may open and how much light may reach film 316 and/or light sensor 502.

A percentage magnification may determine how much zoom to apply for each image or picture that is captured or taken during a multiple framing shot. For example, if FIGS. 1A-1C show three pictures taken during a multiple framing shot and if a user has specified 30% for the percentage magnification, the hotel in FIG. 1B may be 30% larger than that in FIG. 1A and the hotel in FIG. 1C may be 30% larger than that in FIG. 1B.

A number of frames may specify how many pictures are to be taken or images are to be captured in a multiple framing shot.

A delay between framing may specify how long device 200 may wait before taking a picture after taking the previous picture in a multiple framing shot. For example, in FIGS. 1A-1C, if the delay is 0.1 second, the picture in FIG. 1B may have been taken 0.1 second after the picture in FIG. 1A and the picture in FIG. 1C may have been taken 0.1 second after the picture in FIG. 1B.

A multiple framing state may indicate whether device 200 is in a mode for taking multiple framing shots. If the multiple framing state indicates device 200 is in a mode for taking multiple framing shots, a user input for triggering a shot (e.g., clicking on a camera button) may be interpreted by device 200 as a request to take a multiple framing shot.

As explained above, in one implementation, the input values that are related to multiple framing may include a percentage magnification, a number of shots, a delay between shots, and a multiple frame state. For different implementations, other types of input parameters may be accepted by user interface 604. For example, in one implementation, a user may specify only the number of shots. In such an implementation, other parameters, such as the percentage magnification, may be preset and may not be modified by the user.

In addition to the above described input values, many types of inputs for controlling device 200 may be accepted by user interface 604, depending on implementation of device 200. For instance, user interface 604 may accept inputs that instruct device 200 to display an image that has been captured and/or to remove an image from memory 302 and/or database 608.

If a user does not provide one or more input values, user interface 604 may supply default values, such as a default shutter speed or a default opening size of an iris/diaphragm. In addition, user interface 604 may disallow a user from specifying inputs that conflict with other inputs. For example, interface 604 may prevent the user from concurrently inputting the size of iris/diaphragm opening, the shutter speed and the exposure value.

Returning to describing other elements in FIG. 6, photographing control logic 606 may include hardware and/or software for adjusting zoom (i.e., magnification), focus, and exposure of film by controlling lens assembly 312 based on the outputs from sensors 314. In addition, photographing control logic 606 may control the duration for which flash 318 is lit based on the outputs from luminance sensor 504. In many implementations, photographing control logic 606 may provide automatic white balancing.

Database 608 may include records and files and may act as an information repository for framing control logic 602, user interface 604, and/or photographing logic 606. For example, framing control logic 602 may retrieve user-inputted parameters from database 608. User interface 604 may store and/or retrieve images and/or user-inputted values to and from database 608. Photographing control logic 606 may retrieve user-inputted parameters and/or images from database 608.

Exemplary Process for Multiple Framing

Figure 7A:
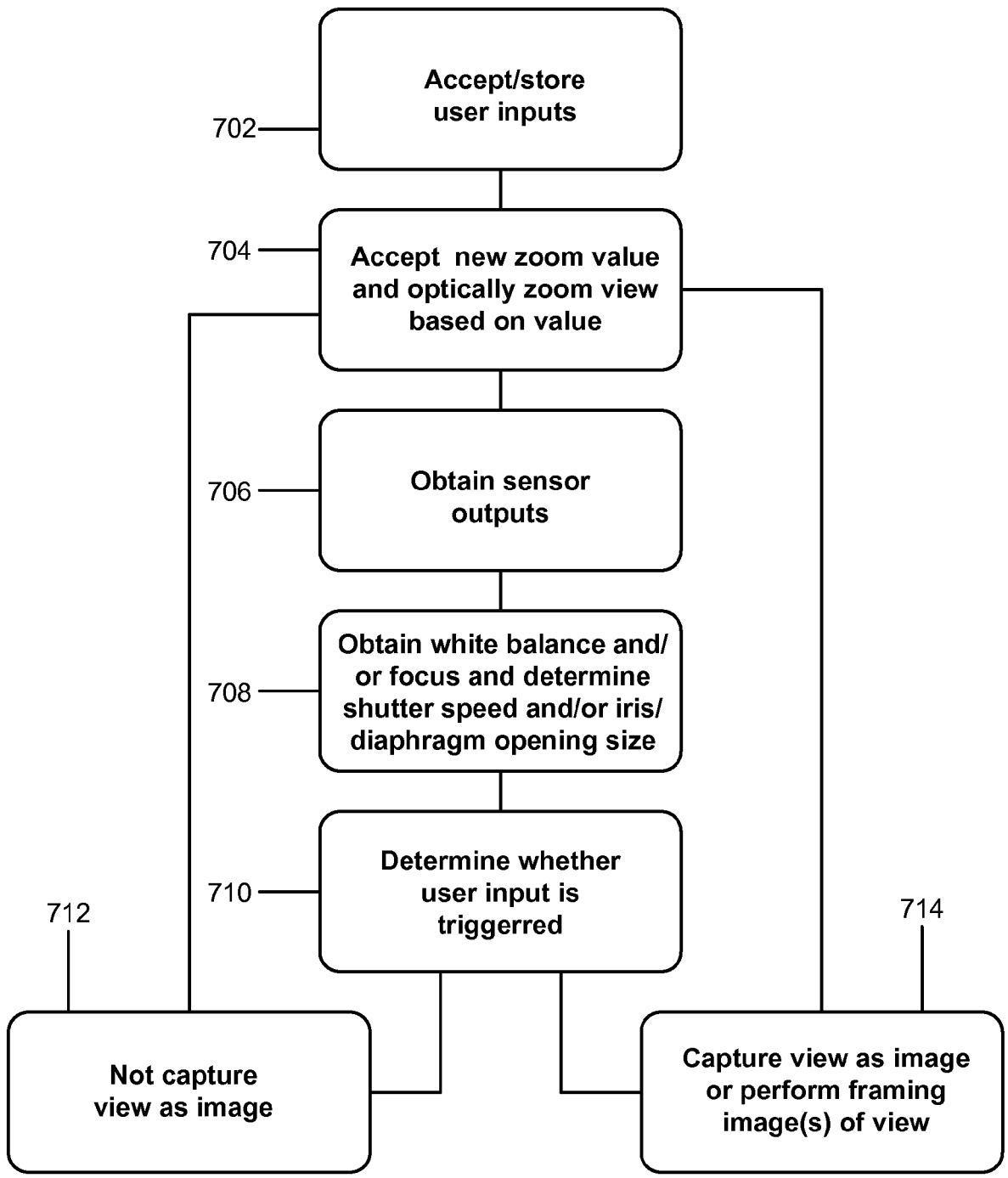
FIG. 7A shows an exemplary process for taking a multiple framing shot.

FIG. 7A shows an exemplary process for taking a multiple framing shot. At block 702, user inputs are accepted and/or stored in database 608 through user interface 604.

At block 704, a new zoom value may be accepted and the view may be optically zoomed based on the value. User interface 608 may allow a user to change zoom easily, as the user may often change zoom, depending on a view. At block 706, outputs from sensors 314 may be obtained. In one implementation, the outputs of luminance sensor 504 and focus sensor 506 may be obtained.

At block 708, the zoom value, the outputs of luminance sensor 504, and focus sensor 506, and the user inputs may be used to obtain a white balance and/or a focus and determine the shutter speed and/or the iris/diaphragm opening size. Any change to a view and/or a zoom may affect the exposure of film 316 and/or light sensor 502, and therefore, the shutter speed and/or the iris/diaphragm opening may be re-determined.

The relationship between the iris/diaphragm opening size and shutter speed (exposure time) may be given by:

$$N^2/t = IS/K, \quad (1)$$

where N measures the ratio of the focal distance of the lens to iris/diaphragm opening (i.e., relative aperture), t is the shutter speed, I is the average luminance, S is the sensitivity of film to light, and K is a calibration constant.

When a zoom and/or a view changes, the shutter speed and the aperture size may be adjusted in accordance with expression (1). Depending on the specific implementation of zoom lens assembly 402, adjusting the magnification may affect its focal distance, which in turn may affect N in expression (1). In addition, changing a view may affect the luminance, I.

At block 710, whether a trigger for taking a shot is activated may be determined. For example, a user may click on a button to trigger device 200 to take a shot of a view. In such an instance, the trigger may be deemed as activated.

If the trigger is not deemed as activated, at block 712, the view is not captured as an image. Until the trigger is activated, blocks 704-712 may be repeated.

If the trigger is deemed as activated, then, at block 714, either the view may be captured as an image, or image(s) of the view may be framed, depending on whether device 200 is in the state of multiple framing. If device 200 is not in the state of multiple framing, photographing control logic 606 may drive flash 318 to shine and shutter assembly 404 to open and close, in order to expose film 316 and/or light sensor 502 to the view for an appropriate amount of light. Any image that is captured on light sensor 502 may be immediately transferred to memory 302. In some implementations, the captured image may be white balanced. Once the view is captured as an image, the process may return to block 704.

Figure 7B:
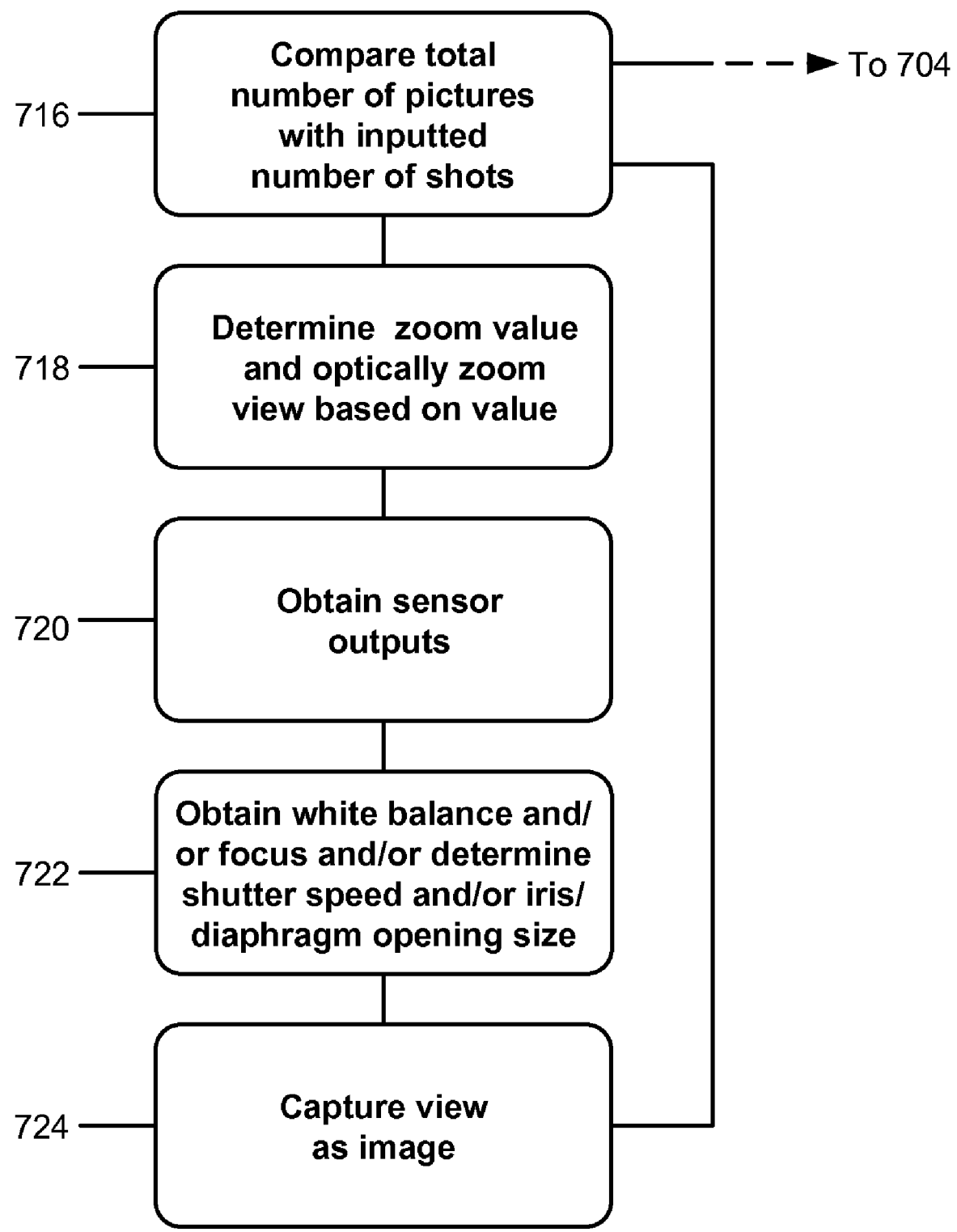
FIG. 7B shows an exemplary process for taking framing images.

If device 200 is in the state for multiple framing, image(s) of the view may be framed. FIG. 7B shows an exemplary process for framing image(s) of a view.

At block 716, a total number of images that have been captured during the framing may be compared with the inputted number of frames. If the number of images that have been captured is greater than or equal to the inputted number, the process may return to block 704 (FIG. 7A). If the number of images that have been captured is less than the inputted number, block 718 may be performed.

At block 718, a zoom value may be obtained and the view may be optically zoomed based on the value. The zoom may be obtained in many ways.

In one implementation, a zoom for a captured image may not be repeated for other images within a single multiple framing shot. For example, if a user has specified 3 shots and 10% magnification for framing, the zoom of the first captured image in the multiple framing shot may be determined as 10% smaller than the zoom set at block 704. The zoom of the second image may be determined as being equivalent to the zoom at block 704, and the zoom of the third image may be determined as 10% larger than the zoom set at block 704.

In another implementation, device 200 may allow a user to input and set zooms for all of the individual images that are to be captured during a multiple framing shot. Such an implementation may be useful, for instance, if a user wishes to take a multiple framing shot of a fast moving subject of whose view changes rapidly.

At block 720, outputs from sensors 314 may be obtained. In one implementation, the outputs of luminance sensor 504 and focus sensor 506 may be obtained. At block 722, the zoom value, the outputs of luminance sensor 504, and focus sensor 506, and the user inputs may be used to obtain a white balance and/or a focus and determine the shutter speed and/or the iris/diaphragm opening size.

At block 724, the view may be captured as an image. When the view is being captured, photographing control logic 606 may drive shutter assembly 404 to open and close, in order to expose film 316 and/or light sensor 502 to the view for an appropriate duration of time. In some implementations, the captured image may be white balanced. Any image that is captured on light sensor 502 may be immediately transferred to memory 302.

Once the view is captured as an image, the process may return to block 716. Each time blocks 716-724 are performed, an image is captured at a zoom level.

Alternative Implementation

Figures 8A, 8B:
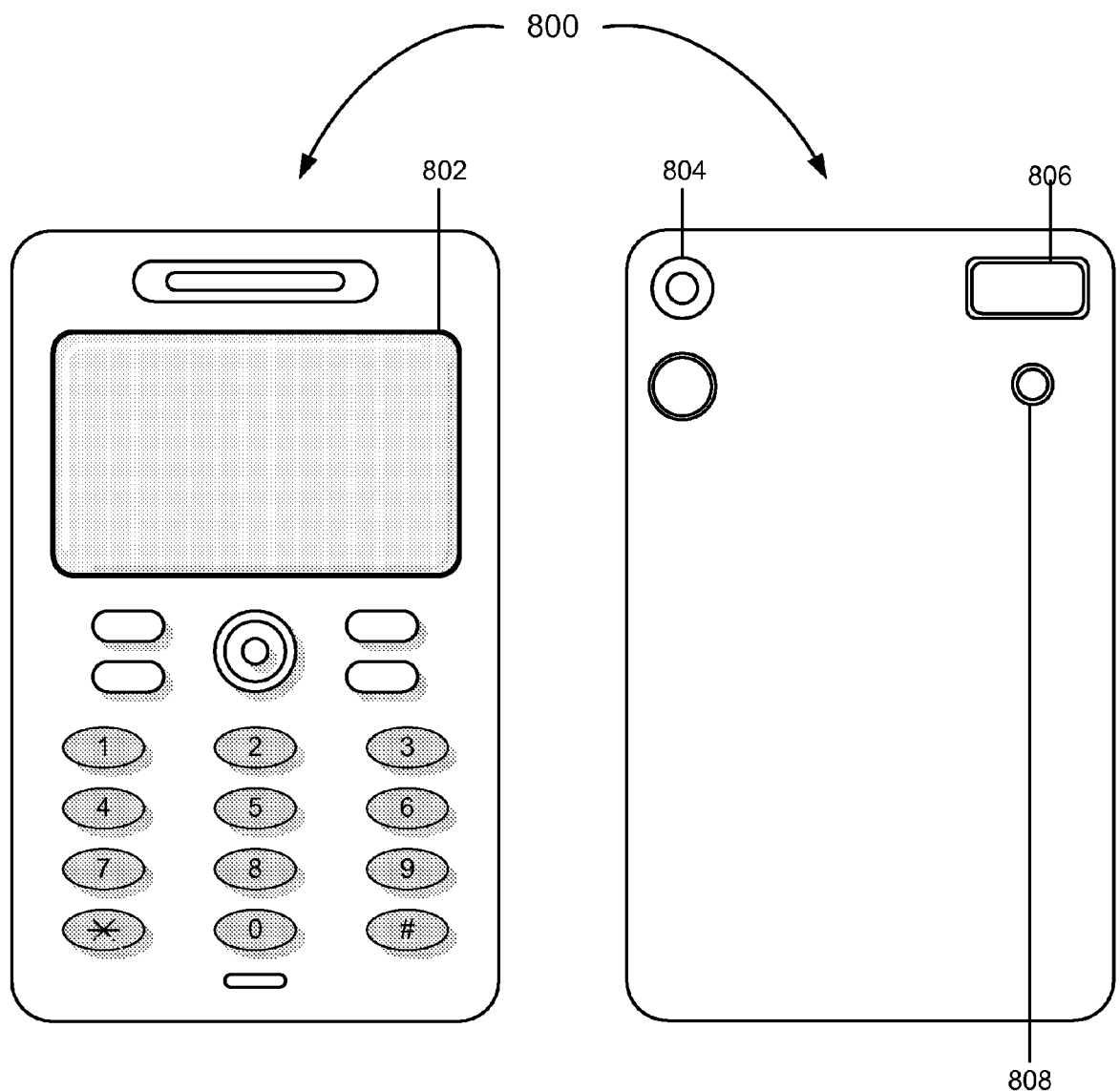
FIGS. 8A and 8B are front and rear views, respectively, of another exemplary device in which the systems and methods described herein can be implemented.

FIGS. 8A and 8B are front and rear views, respectively, of another exemplary device 800 in which systems and methods described herein may be implemented. As shown in FIGS. 8A and 8B, device 800 may include a display 802, a lens assembly 804, a flash 806, and sensors 808. While not shown, device 800 may also include components that have been described with references to FIGS. 3-6.

Display 802 may provide visual information to the user. For example, display 806 may provide information regarding incoming or outgoing calls, media, games, phone books, the current time, etc. In another example, display 802 may provide an electronic viewfinder, e.g., a cathode ray tube (CRT), liquid crystal display (LCD), or an organic light-emitting diode (OLED) based display that a user of device 800 may look through to view and/or focus on a subject and/or to replay previously captured material.

Lens assembly 804, flash 806, and sensors 808 may include components similar to the components of lens assembly 312, flash 318, and sensors 314, and may operate in a manner similar to the manner in which lens assembly 312, flash 318, and sensors 314 operate.

EXAMPLE

The following example illustrates processes involved in multiple framing. The example is consistent with the exemplary process described above with reference to FIGS. 1, 7A and 7B.

Assume that Nilsson, who is visiting Lund, Sweden, powers up device 200 in FIG. 2. In addition, assume that zoom lens assembly 402 in device 200 provides a constant amount of light to various sensors at different foci.

Nilsson inputs 12 for the exposure value, 30% for the percentage of magnification, and 3 for the number of shots for multiple framing. In addition, Nilsson inputs a value for the multiple framing state, so that the value indicates device 200 is in the mode for taking multiple framing shots.

When Nilsson sees a hotel in Lund, Nilsson decides to take pictures and sets the zoom of device 200 at 2×. Device 200 obtains luminance sensor outputs and focus sensor outputs. In addition, based on Nilsson's inputs, the sensor outputs and the zoom value, device 200 obtains the correct focus of the hotel image and set its shutter speed to $\frac{1}{125}$. In this example, device 200 does not change iris/diaphragm opening size.

When Nilsson clicks on a button on device 200 to take a multiple framing shot, device 200 determines that a trigger for taking a shot is activated. Because device 200 is in the multiple framing state, device 200 frames images of the view.

During the multiple framing shot, device 200 compares the total number of images, which have been captured after the trigger has been activated, with the number 3. At this point, the total number of images that have been captured is zero. Finding that additional images may be captured, device 200 obtains a zoom value relative to 2×, which has been set earlier.

In this example, device 200 determines its zoom based on the inputted percentage of magnification. Because Nilsson has inputted 30% magnification, and because the first image of the multiple framing shot is being captured, the device sets the zoom at the smallest value at which 30% magnification may be sequentially applied. The zoom value is set at 77% of the 2× value set by Nilsson (i.e., 1/1.3=0.769, or 77%). Device 200 also may obtain sensor outputs, determine its focus, adjust its shutter speed, and capture the first image of the multiple framing shot. The captured image of the hotel is illustrated in FIG. 1A.

During the multiple framing shot, as long as the total number of captured images is less than 3, device 200 continues to obtain a new zoom value, obtain sensor outputs, determine its focus and the shutter speed, and capture an image. Each time device 200 captures an image, device 200 increases its zoom by 30%.

When device 200 finishes capturing 3 images, the multiple framing shot terminates. Nilsson may decide, after viewing the images shown in FIGS. 1A-1C, that the third image is his favorite and to discard the images in FIGS. 1A and 1B.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIGS. 7A and 7B, the order of the blocks may be modified in other implementations. For example, block 704, 706, and 708 may be performed before as well as after block 702 and/or blocks 704-708 may be repeatedly performed, as a user sees different subjects through a viewfinder. In addition, non-dependent blocks, such as blocks 706, 710, and 720, may represent acts that can be performed in parallel to other blocks.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method of framing a subject with an imaging device, comprising:
   determining a number of images, of the subject, that will automatically be captured in response to a user input;
   selecting an initial zoom value in response to the user in input;
   determining a plurality of zoom values, where each of the plurality of zoom values is associated with a corresponding one of the number of images and where each of the plurality of zoom values is based upon the initial zoom value;
   automatically framing each of the number of images of the subject to the corresponding zoom value, in response to the user input; and
   automatically capturing each of the number of images at the corresponding zoom value.

2. The method of claim 1, where determining a plurality of zoom values includes:
   acquiring the initial zoom value; and
   changing the initial zoom value, for each of the plurality of zoom values, by a percentage of the initial zoom value and in response to another user input.

3. The method of claim 2, where the user in input to change the initial zoom value includes a numerical value representing a percent change of the initial zoom value.

4. The method of claim 1, where the automatically framing further includes obtaining an output from a luminance sensor or a focus sensor.

5. The method of claim 4, where the automatically framing further includes determining a shutter speed or an aperture size based on each of the plurality of zoom values.

6. The method of claim 4, where the automatically framing further includes determining a shutter speed, a white balance, or an aperture size based on the luminance sensor output.

7. The method of claim 4, where the automatically framing further includes focusing the image based on the focus sensor output.

8. The method of claim 1, where the automatically framing further includes transferring each captured image from a light sensor to a memory.

9. The method of claim 1, where the determining a number of images, of the subject, that will automatically be captured includes exposing a light sensor to light from the subject for a predetermined duration of time.

10. A device for framing a subject, comprising:
a zoom lens assembly;
a trigger to cause the device to select an initial zoom value of the zoom lens assembly and capture a number of images of the subject;
a user interface to accept user in input, the user in input including a plurality of zoom values for the zoom lens assembly, where each of the plurality of zoom values is associated with a corresponding one of the number of images and where each of the plurality of zoom values is based upon the initial zoom value;
a database to store the user in input; and
a processor to:
access the database to retrieve the user in input,
cause the zoom lens assembly to automatically frame each of the number of images, of the subject, to the corresponding zoom value, in response to the user in input, and
cause the device to automatically capture each of the number of images at the corresponding zoom value.

11. The device of claim 10, further comprising:
a luminance sensor to provide information related to brightness of the subject.

12. The device of claim 10, further comprising:
film to image the subject.

13. The device of claim 10, further comprising:
a light sensor to image the subject.

14. The device of claim 13, where the zoom lens assembly includes:
a shutter assembly to expose the light sensor for a predetermined amount of time.

15. The device of claim 10, where the user interface accepts a user input that specifies a magnification for each of the number of images.

16. A device for framing a subject, comprising:
means for storing images;
means for optically zooming an image;
means for triggering the device to select an initial zoom value of the means for optically zooming an image and for triggering the device to capture a number of images of the subject;
means for accepting a plurality of zoom values for the means for optically zooming an image, where each of the plurality of zoom values is associated with a corresponding one of the number of images and where each of the plurality of zoom values is based upon the initial zoom value;
means for storing the plurality of zoom values;
means for retrieving the plurality of zoom values;
means for causing the means for optically zooming an image to automatically frame each of the number of images, of the subject, to the corresponding zoom value, in response to the user input; and
means for causing the device to automatically capture each of the number of images at the corresponding zoom value.

17. The device as in claim 16, further comprising:
means for providing luminance information, while balance information, or focus information.

18. The device as in claim 16, wherein the means for causing the device to automatically capture each of the number of images at the corresponding zoom value includes:
means for exposing a sensor to a predetermined amount of light, and
means for transferring each of the captured images to the means for storing images.

19. The device as in claim 16, further comprising:
means for adjusting shutter speed when a subject changes.

* * * * *

UNITED STATES PATENT AND TRADEMARK OFFICE
CERTIFICATE OF CORRECTION

| | |
|---|---|
| PATENT NO. | : 7,664,383 B2 |
| APPLICATION NO. | : 11/624260 |
| DATED | : February 16, 2010 |
| INVENTOR(S) | : Rene Nilsson |

Page 1 of 1

It is certified that error appears in the above-identified patent and that said Letters Patent is hereby corrected as shown below:

Column 10, line 41, after "user" delete the word "in".

Signed and Sealed this

Twentieth Day of April, 2010

David J. Kappos
*Director of the United States Patent and Trademark Office*